(12) United States Patent
Park (10) Patent No.: US 8,826,364 B2
(45) Date of Patent: Sep. 2, 2014

(54) METHOD AND APPARATUS FOR INFORMING OCCURRENCE OF EVENT OF COMMUNICATION TERMINAL IN DIGITAL TV

(75) Inventor: Kyu-Hee Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/324,883

(22) Filed: Dec. 13, 2011

(65) Prior Publication Data

US 2012/0151536 A1 Jun. 14, 2012

(30) Foreign Application Priority Data

Dec. 13, 2010 (KR) ........................ 10-2010-0126824

(51) Int. Cl.
*H04N 7/10* (2006.01)
*H04N 7/025* (2006.01)
*H04N 7/16* (2011.01)
*H04M 11/00* (2006.01)
*H04M 11/04* (2006.01)

(52) U.S. Cl.
USPC ............... 725/141; 725/32; 725/34; 725/135; 725/139; 455/403; 455/404.1; 455/404.2

(58) Field of Classification Search
USPC .......................................................... 725/58
See application file for complete search history.

(56) References Cited

U.S. PATENT DOCUMENTS

| | | | |
|---|---|---|---|
| 2007/0275690 A1* | 11/2007 | Hunter et al. | 455/404.2 |
| 2008/0242319 A1* | 10/2008 | Paschetto et al. | 455/456.6 |
| 2009/0125948 A1* | 5/2009 | Kuhlke et al. | 725/58 |
| 2010/0017816 A1* | 1/2010 | Martini et al. | 725/31 |
| 2010/0066805 A1* | 3/2010 | Tucker et al. | 348/14.08 |

* cited by examiner

*Primary Examiner* — Justin Shepard (57) ABSTRACT

A method and apparatus for informing of the occurrence of an event of a communication terminal in a digital Television (TV) are provided. A method of a TV output generator of informing a digital TV of the occurrence of an event of a communication terminal is provided. The method includes receiving an input of event information from any one of a landline and a mobile terminal, generating a control signal including output information corresponding to the event information, and transmitting the control signal to the TV.

21 Claims, 8 Drawing Sheets

METHOD AND APPARATUS FOR INFORMING OCCURRENCE OF EVENT OF COMMUNICATION TERMINAL IN DIGITAL TV

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Dec. 13, 2010 and assigned Serial No. 10-2010-0126824, the contents of which are herein incorporated by reference.

TECHNICAL FIELD OF THE INVENTION

The present invention relates to a digital television (TV).

BACKGROUND OF THE INVENTION

In recent years, due to the development of a communication technology, communication terminals are in trend of miniaturization. Such miniaturization of the communication terminals can improve user's portability, but there is a problem in which some users suffer inconveniences due to small screens of the communication terminals. For example, very old users of poor eyesight suffer a difficulty in receiving a delivery of information from the small screens of the communication terminals.

Generally, when users work outdoors, communication terminals are on users' persons all the time but, when the users work indoors, in most cases, they put the communication terminals in constant places. For example, most of users always carry cellular phones outdoors with putting them in their pockets or bags, but, if getting home, they watch on TV or do other leisure activities indoors with putting the cellular phones in a place such as on a desk, at the side of TV, and at a bed. According to this, it often occurs that, although a call or message is received or an alarm is generated in the cellular phone indoors, the user fails to recognize this immediately. Due to this, the user can suffer a difficult situation in which he/she misses a significant contact or appointment and the like.

Accordingly, there is a need to provide a technique for solving a problem of information delivery resulting from the small screen of the communication terminal and a problem of failure to recognize an event occurring in the communication terminal.

SUMMARY OF THE INVENTION

To address the above-discussed deficiencies of the prior art, it is a primary object to provide at least the advantages below. Accordingly, one aspect of the present disclosure is to provide a method and apparatus for sensing the occurrence of an event of a communication terminal and informing a user of the sensed event occurrence in a digital television (TV).

Another aspect of the present disclosure is to provide a method and apparatus for informing a user of information about an outgoing phone number of a call income by a wired phone or mobile phone and a message in a digital TV.

The above aspects are achieved by providing a method and apparatus for informing of the occurrence of an event of a communication terminal in a digital TV.

According to one aspect of the present disclosure, a method of a TV output generator of informing a digital TV of the occurrence of an event of a communication terminal is provided. The method includes receiving an input of event information from any one of a landline and a mobile terminal, generating a control signal including output information corresponding to the event information, and transmitting the control signal to the TV.

According to another aspect of the present disclosure, an apparatus of a TV output generator of informing a digital TV of the occurrence of an event of a communication terminal is provided. The apparatus includes an input unit, a controller, and an output unit. The input unit receives an input of event information from any one of a landline and a mobile terminal. The controller generates a control signal including output information corresponding to the event information. The output unit transmits the control signal to the TV.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged display.

The present disclosure relates to a method and apparatus for informing that an event takes place in a communication terminal through the digital TV.

Preferred embodiments of the present disclosure will be described herein below with reference to the accompanying drawings. In the following description, well-known functions or constructions are not described in detail since they would obscure the disclosure in unnecessary detail. Also, terms described below, which are defined considering functions in the present disclosure, can be different depending on user and operator's intention or practice. Therefore, the terms should be defined on the basis of the disclosure throughout this specification.

A method and apparatus for informing of the occurrence of an event of a communication terminal in a digital television (TV) according to the present disclosure are described below. In the following description, a TV output generator is a device of receiving information of a wired phone or mobile phone and providing the received information to the digital TV and can be, for example, a set-top box. Also, the TV output generator constructed apart from the digital TV is described by way of example, but the TV output generator may be included in the digital TV. That is, a function of the TV output generator can be also carried out in the digital TV in the following description.

Figure 1:
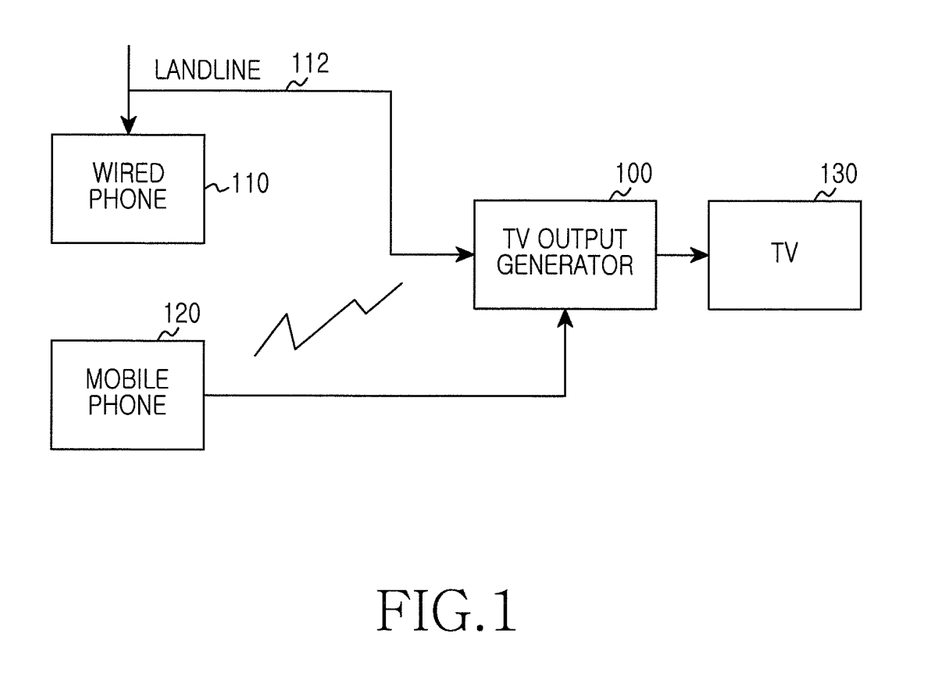
FIG. 1 illustrates a construction of a system for displaying call information in a digital television (TV) according to the present disclosure.

FIG. 1 illustrates a construction of a system for displaying call information in a digital TV according to the present disclosure.

Referring to FIG. 1, a TV output generator 100 receives an input of a call or message related signal income by a wired phone 110 from a landline 112, and wired or wirelessly receives information related to the generation of an incoming call or message, an alarm, and a schedule from a mobile phone 120.

The TV output generator 100 performs a function for, when a signal is input from the landline 112 or mobile phone 120, controlling a power source, video, and sound of the TV 130 and outputting information corresponding to the input signal through a screen or speaker of the TV 130. That is, the TV output generator 100 analyzes the input signal, converts the input signal into a video signal or voice signal outputtable from the TV 130, and then delivers both the signal controlling the power source, video, and sound of the TV 130 and the converted video or voice signal to the TV 130. At this time, the TV output generator 100 and the TV 130 can connect with each other by means of a High-Definition Multimedia Interface (HDMI) cable.

According to a control signal input from the TV output generator 100, the TV 130 outputs a video signal, which is input from the TV output generator 100, to the screen or outputs a voice signal to the speaker.

When an event occurs in the mobile phone 120, the mobile phone 120 wired or wirelessly provides event related information to the TV output generator 100. For example, when a call or message incoming event occurs, the mobile phone 120 can provide a phone number of an income call or an income message to the TV output generator 100. If it is a preset alarm or schedule time, the mobile phone 120 can provide alarm or schedule related data (e.g., an alarm title, an alarm content, a schedule title, a schedule time, a schedule place and the like) to the TV output generator 100.

Figure 2:
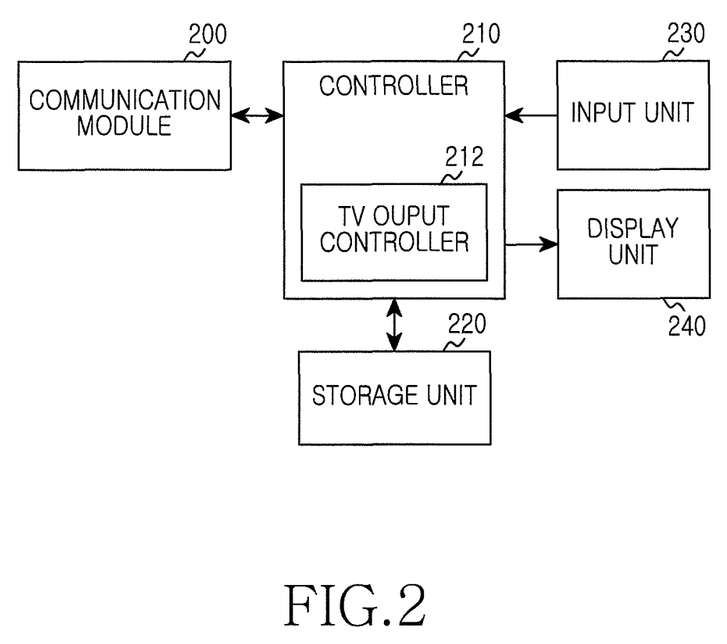
FIG. 2 illustrates a construction of a communication terminal according to an exemplary embodiment of the present disclosure.

FIG. 2 illustrates a construction of a mobile phone according to an exemplary embodiment of the present disclosure.

Referring to FIG. 2, the mobile phone includes a communication module 200, a controller 210, a storage unit 220, an input unit 230, and a display unit 240, and the controller 210 includes a TV output controller 212.

Under the control of the controller 210, the communication module 200 performs a function of transmitting/receiving a signal with other devices according to a preset scheme. Particularly, the communication module 200 receives an income call or message through a base station and provides the call or message to the controller 210. Also, under the control of the controller 210, the communication module 200 transmits a signal to a TV output generator. At this time, the communication module 200 may transmit a signal from the controller 210 to the TV output generator through a wired line connecting with the TV output generator or may transmit a signal to the TV output generator through a local area communication technology.

The controller 210 controls and processes a general operation of the mobile phone. Particularly, by including the TV output controller 212 according to the present disclosure, the controller 210 controls and processes a function for, when an event occurs in the mobile phone, transmitting generated event related information to the TV output generator. For example, the TV output controller 212 controls and processes a function for, when a call or message is income by the mobile phone, transmitting a phone number of the income call or the income message to the TV output generator, and controls and processes a function for, if it is an alarm or schedule time preset by a user, providing alarm or schedule related data (e.g., an alarm title, an alarm content, a schedule title, a schedule time, a schedule place and the like) to the TV output generator.

The TV output controller 212 controls a function for, when the use of a TV output function has been set by a user, transmitting event related information generated in the mobile phone to the TV output generator. When the non-use of the TV output function has been set, the TV output controller 212 may not transmit the event related information generated in the mobile phone to the TV output generator.

The storage unit 220 stores various programs and data for operation of the mobile phone. Particularly, the storage unit 220 can store a program necessary for outputting event related information generated in the mobile phone to a TV.

The input unit 230 includes at least one key button or touch sensor, and provides data corresponding to a key pressed by a user or a coordinate of a screen touched by the user, to the controller 210. The input unit 230 receives an input of data for setting the use or non-use of the TV output function through the key button or touch sensor and provides the input data to the controller 210.

The display unit 240 displays various state information generated during an operation of the mobile phone, numerals, characters, and videos. Particularly, according to the control of the controller 210, the display unit 240 can display generated event related information, and display information representing that the event related information is in output to the TV.

Figure 3:
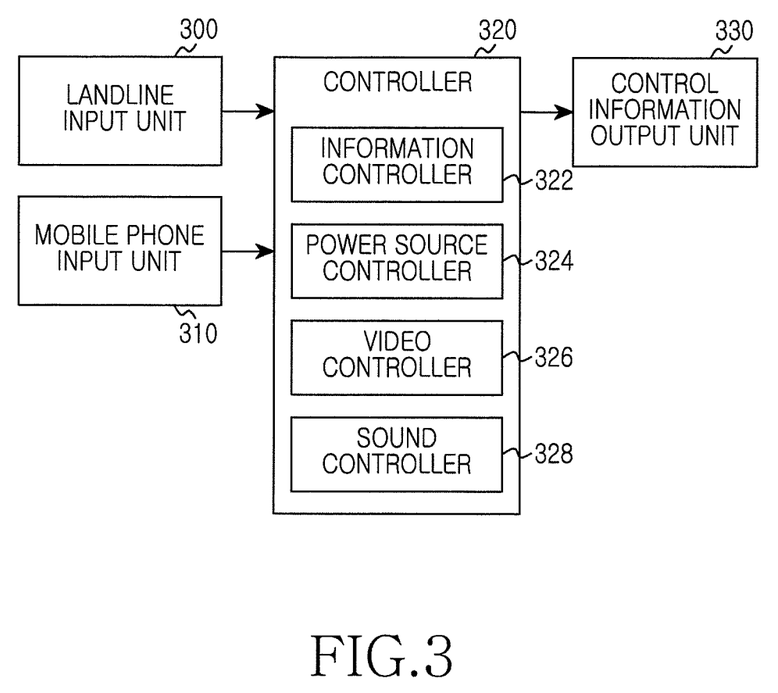
FIG. 3 illustrates a construction of a TV output generator according to an exemplary embodiment of the present disclosure.

FIG. 3 illustrates a construction of a TV output generator according to an exemplary embodiment of the present disclosure.

Referring to FIG. 3, the TV output generator includes a landline input unit 300, a mobile phone input unit 310, a controller 320, and a control information output unit 330. The controller 320 includes an information controller 322, a power source controller 324, a video controller 326, and a sound controller 328.

The landline input unit 300 provides information received from a landline, to the information controller 322 of the controller 320. That is, the landline input unit 300 provides a phone number of an income call and message information received from the landline, to the controller 320.

The mobile phone input unit 310 wired or wirelessly receives a signal from a mobile phone and provides the signal to the controller 320. The mobile phone input unit 310 can receive event related information generated in the mobile phone, from the mobile phone.

The controller 320 controls and processes a function for analyzing a signal input through the landline input unit 300 and the mobile phone input unit 310, generating a video signal or voice signal outputtable from a TV, controlling a power source, video, and sound of the TV, and outputting the generated video signal or voice signal to the TV.

That is, the information controller 322 analyzes information input from the landline input unit 300 and mobile phone input unit 310 according to a preset scheme, and generates data to be output to a screen of the TV and an audio signal to be output to a speaker of the TV. For example, the information controller 322 can analyze a caller identification (CID) in a signal input from the landline input unit 300 and generate outgoing phone number information of an income call. Also, the information controller 322 can analyze a signal input from the mobile phone input unit 310 and generate an outgoing phone number of a call income by the mobile phone or an outgoing phone number of an income message and message content information, and generate alarm or schedule related information (e.g., an alarm title, an alarm content, a schedule title, a schedule time, and a schedule place) generated in the mobile phone. Also, the information controller 322 can generate an audio signal of informing the occurrence of the income call, the message, the alarm, and the schedule. At this time, the audio signal can be differently generated every event occurring.

The power source controller 324 outputs a signal for controlling a power source of a previously connected TV. The power source controller 324 controls and processes a function for, when a signal is received from the landline input unit 300 or mobile phone input unit 310, checking a power On/Off state of the connected TV and, when the TV is in a power Off state, outputting a control signal representing power On to the TV. At this time, the power source controller 324 controls and processes a function for sensing if a user input is generated in the TV and, if the user input is not sensed within a predetermined time, outputting a control signal representing the power Off of the TV. When the user input is sensed within the predetermined time, the controller 324 terminates a power source control function of the TV.

The video controller 326 outputs a signal for controlling a channel of the previously connected TV. That is, the video controller 326 can output a control signal of requesting for change into a preset channel for TV output.

The sound controller 328 outputs a signal for controlling a sound of the previously connected TV. That is, the sound controller 328 can output a control signal of requesting for changing a volume level of outputting a voice signal of the TV into a preset volume. At this time, the preset volume can be set and changed by a user.

The control information output unit 330 transmits control information generated in the controller 320 to the TV. That is, the control information output unit 330 provides output information generated in the information controller 322, a power source control signal generated in the power source controller 324, a channel control signal generated in the video controller 326, and a sound control signal generated in the sound controller 328, to the previously connected TV.

Figure 4:
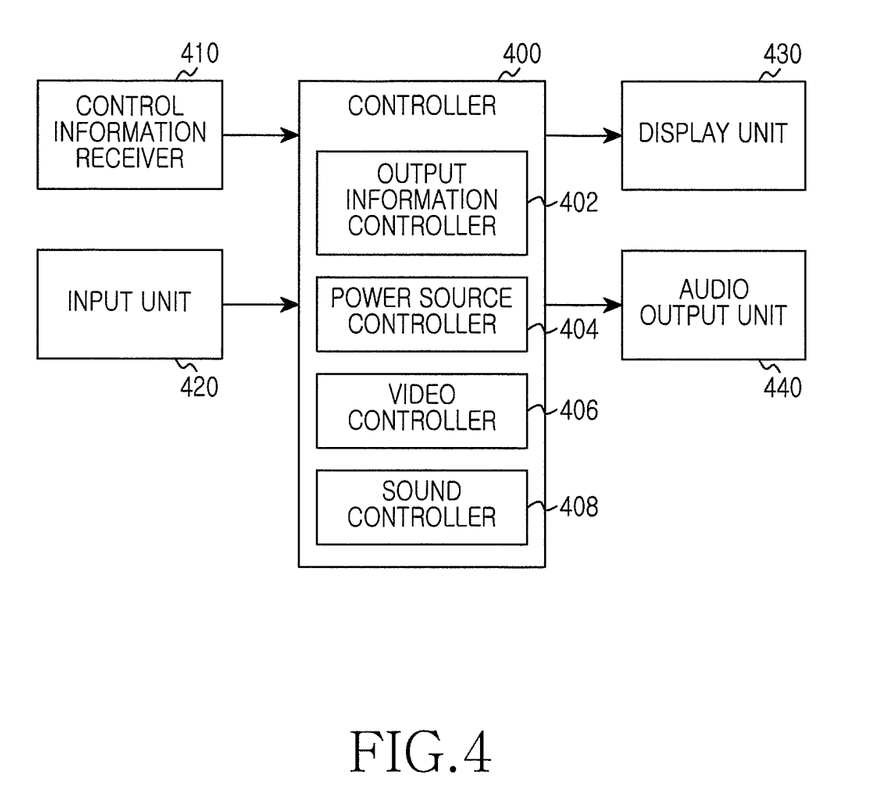
FIG. 4 illustrates a construction of a digital TV according to an exemplary embodiment of the present disclosure.

FIG. 4 illustrates a construction of a digital TV according to an exemplary embodiment of the present disclosure.

Referring to FIG. 4, the digital TV includes a controller 400, a control information receiver 410, an input unit 420, a display unit 430, and an audio output unit 440. The controller 400 includes an output information controller 402, a power source controller 404, a video controller 406, and a sound controller 408.

The controller 400 controls and processes the general operation of the digital TV. Particularly, according to the present disclosure, the controller 400 controls a power source, a video, and a sound according to a control signal input from a TV output generator, and displays information on an event occurring in a wired phone or mobile phone. For example, the output information controller 402 controls and processes a function for outputting output information provided from the TV output generator to the display unit 430 and the audio output unit 440. Also, according to power source control information provided from the TV output generator, the power source controller 404 turns On/Off a power source of the digital TV.

According to a video control signal provided from the TV output generator, the video controller 406 changes or maintains a channel of the digital TV. According to a sound control signal provided from the TV output generator, the sound controller 408 controls an output volume of the digital TV. At this time, after controlling the power source, the video, and the sound according to a control signal input from the TV output generator, the controller 400 controls a function for, when a user input is generated through the input unit 420, outputting output information to the display unit 430 and audio output unit 440. For instance, when a control signal including an outgoing phone number of an income call is input from the TV output generator, the controller 400 adjusts a power source, channel of the TV in order to show the outgoing phone number of the income call and then, waits for a user input to be generated. If the user input is generated, the controller 400 controls to display the outgoing phone number on the display unit 430 through the adjusted channel.

The control information receiver 410 receives control information from the TV output generator and provides the control information to the controller 400. For example, the control information receiver 410 receives information to be output to the display unit 430, a power source control signal, a channel control signal, and a sound control signal, and provides the received information and signals to the controller 400.

The input unit 420 includes at least one key button or touch sensor, and provides data corresponding to a key pressed by a user or a coordinate of a screen touched by the user, to the controller 400. The input unit 420 receives an input of data for channel or volume change through user's key pressing or touch, and provides the input data to the controller 400.

Figure 8A:
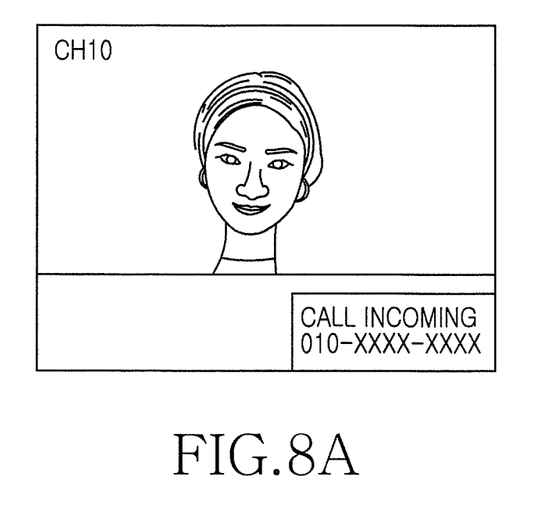
FIGS. 8A and 8B illustrate an example of displaying an outgoing phone number of a call income by a communication terminal in a digital TV according to an exemplary embodiment of the present disclosure.
Figure 8B:
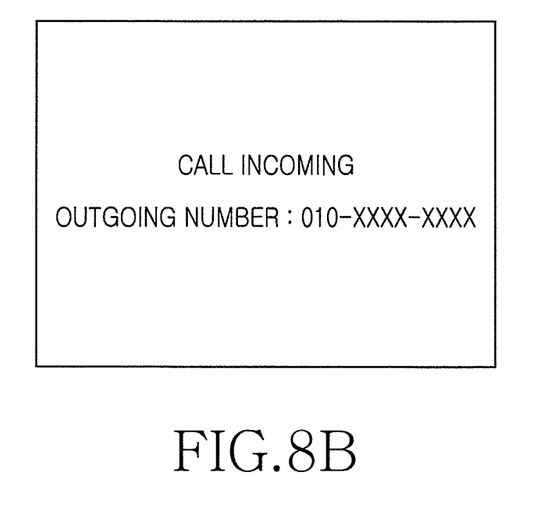

The display unit 430 displays various state information generated during an operation of the digital TV, numerals, characters, and videos. That is, under the control of the controller 400, the display unit 430 displays a video received from a channel decided by a user. Particularly, according to the present disclosure, the display unit 430 displays output information provided from the TV output generator under the control of the controller 400. For example, as illustrated in FIGS. 8A and 8B, according to the control of the controller 400, in circumstances in which a video of a present channel is in display, the display unit 430 can display the output information on a predetermined region of a screen, or change a channel and display the output information on the whole screen.

The audio output unit 440 outputs an audio signal generated during an operation of the digital TV. That is, the audio output unit 440 outputs an audio signal received from a channel decided by a user, at a volume level decided by the user. Particularly, according to the present disclosure, under the control of the controller 400, the audio output unit 440 outputs a predetermined audio signal according to a sound control signal provided from the TV output generator or outputs an audio signal included in output information provided from the TV output generator.

Figure 5:
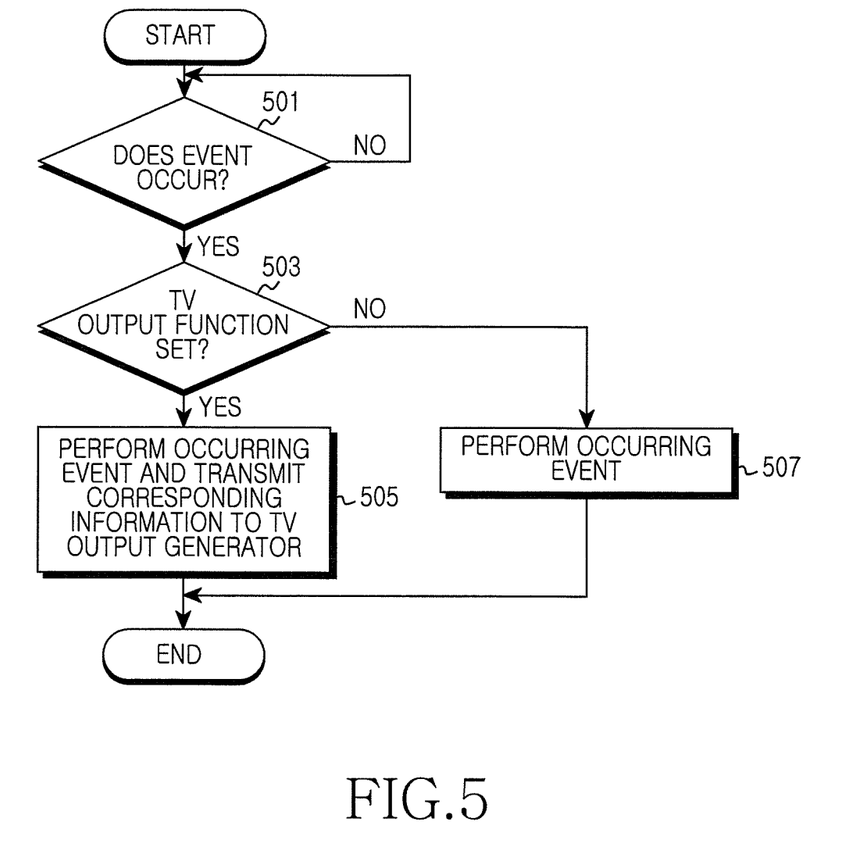
FIG. 5 illustrates a process of a communication terminal according to an exemplary embodiment of the present disclosure.

FIG. 5 illustrates a process of a mobile phone according to an exemplary embodiment of the present disclosure.

Referring to FIG. 5, in step 501, the mobile phone determines if an event needing digital TV output takes place. For example, the mobile phone determines the occurrence or non-occurrence of an event that a call or message is received or it is a preset alarm or schedule time and the like.

If it is determined in step 501 that the event occurs, in step 503, the mobile phone determines if a TV output function for outputting the occurring event to a TV has been set. If it is determined in step 503 that the TV output function has not been set, the mobile phone proceeds to step 507 and performs a function corresponding to the occurring event and then, terminates an algorithm according to the exemplary embodiment of the present disclosure.

In contrast, if it is determined in step 503 that the TV output function has been set, the mobile phone proceeds to step 505 and performs the function corresponding to the occurring event, and provides information on the occurring event to a TV output generator. For example, when an income call is generated, the mobile phone can provide an outgoing phone number of the income call to the TV output generator and, when an income message is generated, the mobile phone can provide a message content and outgoing phone number of the income message to the TV output generator. Also, when it is a preset alarm time, the mobile phone provides a title and content of a set alarm to the TV output generator and, when it is a preset schedule time, the mobile phone provides a title, a time, a place and the like of a set schedule to the TV output generator.

After that, the mobile phone terminates the algorithm according to the exemplary embodiment of the present disclosure.

Figure 6:
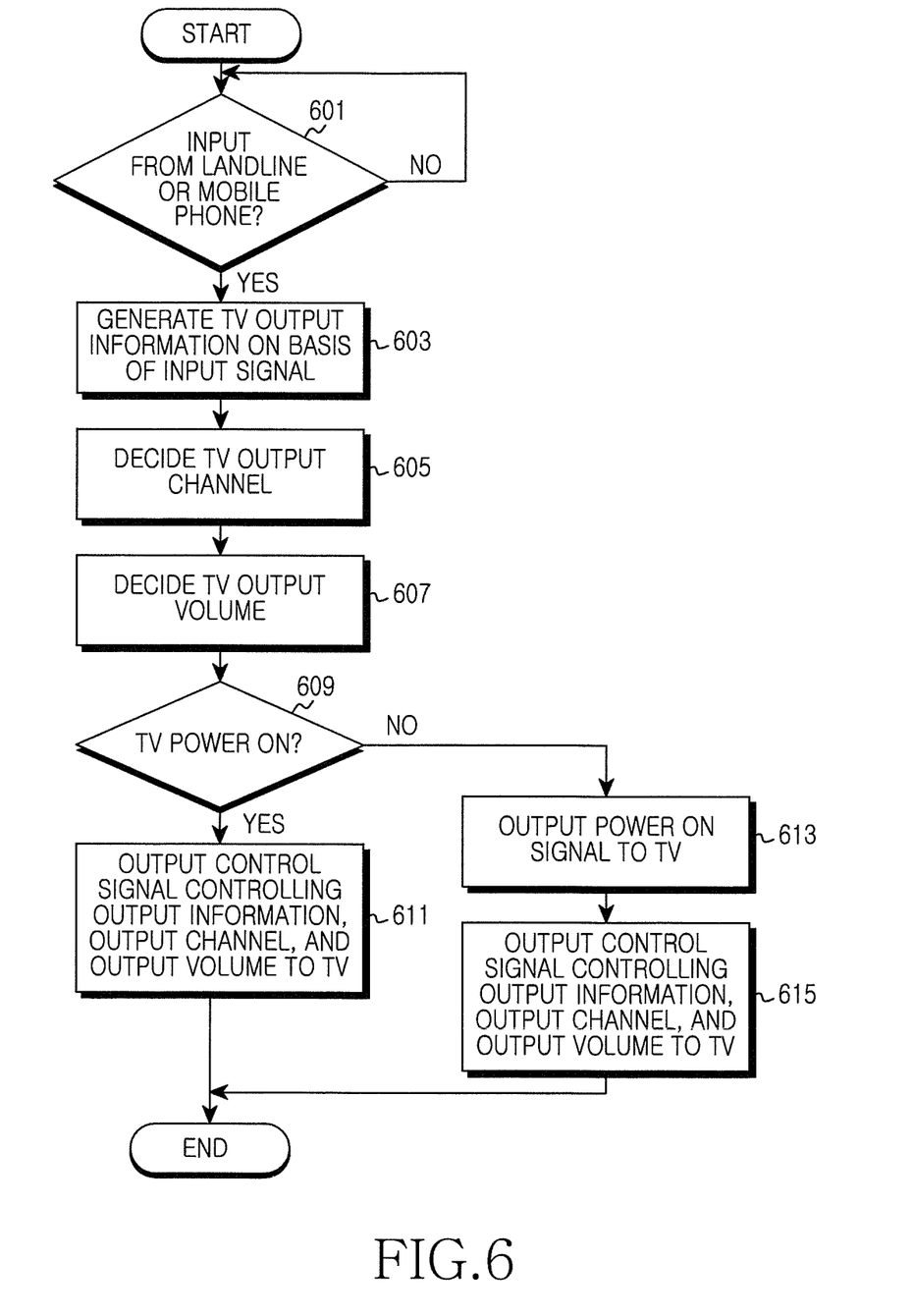
FIG. 6 illustrates a process of a TV output generator according to an exemplary embodiment of the present disclosure.

FIG. 6 illustrates an operation procedure of a TV output generator according to an exemplary embodiment of the present disclosure.

Referring to FIG. 6, in step 601, the TV output generator determines if an input is generated from a landline or mobile phone. When the input is generated from the landline or mobile phone, the TV output generator proceeds to step 603 and generates TV output information on the basis of an input signal.

After that, in step 605, the TV output generator decides a TV output channel and, in step 607, decides a TV output volume. At this time, the TV output generator can decide a preset channel and volume as a TV output channel and output volume, or decide a current channel and volume of the TV as the TV output channel and output volume.

Next, in step 609, the TV output generator determines if a TV is in a power On state. When the TV is in the power On state, in step 611, the TV output generator outputs an output control signal controlling output information, an output channel, and an output volume to the TV.

In contrast, when the TV is in a power Off state, the TV output generator proceeds to step 613 and outputs a control signal representing power On to the TV and, in step 615, the TV output generator outputs an output control signal controlling output information, an output channel, and an output volume to the TV.

After that, the TV output generator terminates an algorithm according to the exemplary embodiment of the present disclosure.

Figure 7:
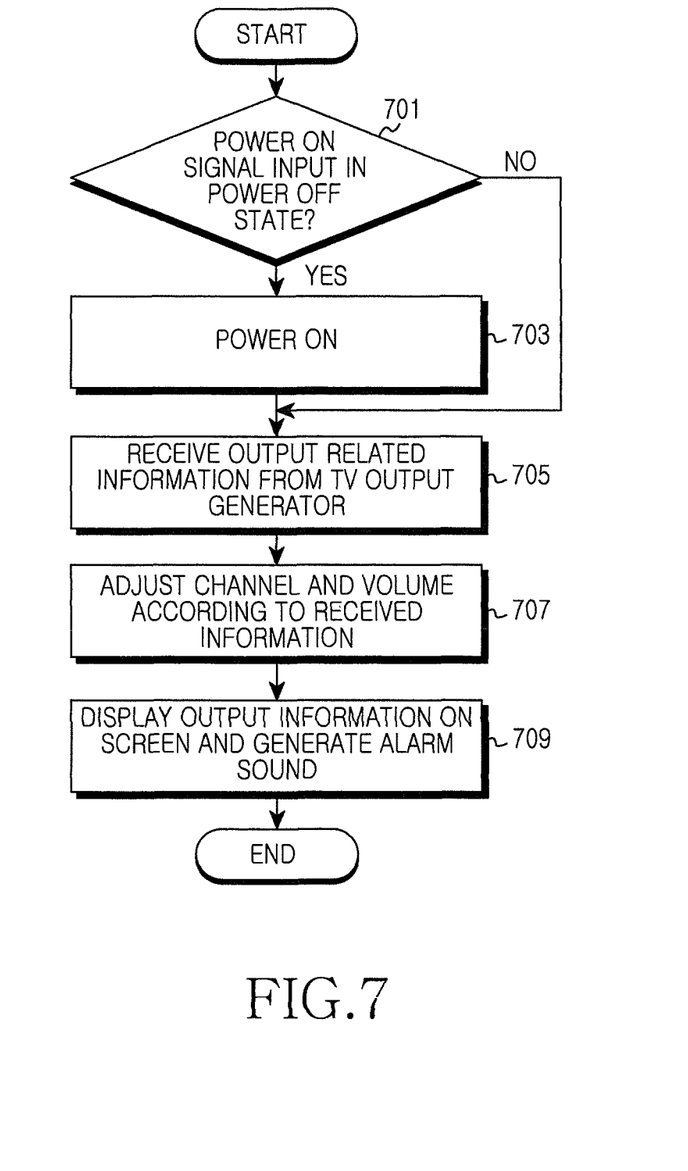
FIG. 7 illustrates a process of a digital TV according to an exemplary embodiment of the present disclosure.

FIG. 7 illustrates an operation procedure of a digital TV according to an exemplary embodiment of the present disclosure.

Referring to FIG. 7, in step 701, the digital TV determines if a power On signal is input in a power Off state. If the digital TV is not in the power Off state, the digital TV proceeds to step 705.

If the power On signal is input in the power Off state, the digital TV proceeds to step 703 and turns On a power source, and proceeds to step 705 and receives an output control signal from a TV output generator.

Next, the digital TV proceeds to step 707 and controls a channel and volume of the digital TV according to an output channel and output volume that are included in the output control signal. After that, the digital TV proceeds to step 709 and displays output information included in the output control signal on a constant region of a screen or the whole region, and outputs a preset alarm sound. Here, the digital TV can output the output information on the screen using a picture-in-picture (PIP) mode or output the output information on the screen through a separate popup window. When a user watches on TV, the digital TV may output the output information on the screen in various manners within a limit not disturbing the TV watching.

After that, the digital TV terminates an algorithm according to the exemplary embodiment of the present disclosure.

In the present disclosure described above, a description has been made for informing the occurrence of an event of a communication terminal in a digital TV, but it is undoubted that it is applicable in the same manner even to other electronic devices making video signal and voice signal output possible.

Also, the above description has been made for income call, message, alarm, and schedule by way of example, but it may be identically applied even to various events (e.g., low battery notification, instant messenger buddy login, and the like) of providing information to a user in the communication terminal.

As described above, exemplary embodiments of the present disclosure have an effect of being capable of allowing the old, the deaf, and users of heavily noisy places to easily recognize the occurrence of an income call and obtain information on the income call, by displaying information on an event occurring in a communication terminal on a screen or outputting the same by an audio signal in a digital TV.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of operating a television (TV) output generator, the method comprising:
   receiving a notification of an occurrence of a scheduled event from a mobile terminal;
   generating a control signal comprising output information including a title of the scheduled event, a time of the scheduled event, and a location for the scheduled event and channel control information indicating a channel on which the output information is to be displayed; and
   transmitting the control signal to a digital TV.

2. The method of claim 1, wherein the control signal further comprises at least one of an output data signal, an output audio signal, a power source control signal, and a volume control signal.

3. The method of claim 1, wherein the TV output generator is a set-top box connected with the digital TV through a wired cable.

4. The method of claim 3 further comprising:
   when the notification is received, checking a power On/Off state of the digital TV; and
   when the digital TV is in the power Off state, transmitting a power On signal to the digital TV.

5. The method of claim 1, wherein the TV output generator is built in the digital TV.

6. The method of claim 5 further comprising:
   outputting the output information through a screen of the digital TV.

7. The method of claim 6 further comprising:
   before outputting the output information to the screen, receiving a request for provision of output information from a user.

8. The method of claim 1 further comprising:
   identifying an output channel and an output volume for the control signal; and
   including the output channel and the output volume in the control signal.

9. The method of claim 1 further comprising:
   displaying video data and audio data associated with the notification in the digital TV.

10. The method of claim 1, wherein the TV output generator is connected with the digital TV through a wireless connection.

11. The method of claim 1, further comprising:
    generating and transmitting to the digital TV a notification of an event, wherein the event comprises at least one of an incoming call event, an incoming message event, a preset schedule event, a battery residual quantity event, or an instant messenger event.

12. An apparatus of a television (TV) output generator, the apparatus comprising:
    an input unit configured to receive a notification of an occurrence of a scheduled event from a mobile terminal;
    a controller configured to generate a control signal comprising output information including a title of the scheduled event, a time of the scheduled event, and a location for the scheduled event and channel control information indicating a channel on which the output information is to be displayed; and
    an output unit configured to transmit the control signal to a digital TV.

13. The apparatus of claim 12, wherein the control signal further comprises at least one of an output data signal, an output audio signal, a power source control signal, and a volume control signal.

14. The apparatus of claim 12, wherein the TV output generator is a set-top box connected with the digital TV through a wired cable.

15. The apparatus of claim 14, wherein the controller is further configured to check a power On/Off state of the digital TV when the notification is received, and transmit a power On signal to the digital TV when the digital TV is in the power Off state.

16. The apparatus of claim 12, wherein the TV output generator is built in the digital TV.

17. The apparatus of claim 16, wherein the controller is configured to control to output the output information through a screen of the digital TV.

18. The apparatus of claim 17, wherein the controller is further configured to receive a request for provision of output information from a user before outputting the output information to the screen.

19. The apparatus of claim 12, wherein the controller is further configured to identify an output channel and an output volume for the control signal and include the output channel and the output volume in the control signal.

20. The apparatus of claim 12, wherein the digital TV is configured to display video data and audio data associated with the notification.

21. The apparatus of claim 12, wherein the TV output generator is connected with the digital TV through a wireless connection.

* * * * *